(12) United States Patent
Park et al.

(10) Patent No.: US 7,432,976 B2
(45) Date of Patent: Oct. 7, 2008

(54) METHOD FOR CLOSE-RANGE AND GENERAL-RANGE PHOTOGRAPHING BY DIGITAL CAMERA

(75) Inventors: Myoung-hoon Park, Seongnam-si (KR); Dong-min Kim, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 641 days.

(21) Appl. No.: 11/034,019

(22) Filed: Jan. 12, 2005

(65) Prior Publication Data

US 2005/0157208 A1    Jul. 21, 2005

(30) Foreign Application Priority Data

Jan. 20, 2004    (KR) ...................... 10-2004-0004443

(51) Int. Cl.
 *H04N 5/222* (2006.01)
(52) U.S. Cl. ..................................... 348/371
(58) Field of Classification Search ................. 348/371, 348/370
See application file for complete search history.

(56) References Cited

U.S. PATENT DOCUMENTS

| | | | | |
|---|---|---|---|---|
| 3,779,142 A * | 12/1973 | Yata et al. | .................... | 396/159 |
| 4,816,854 A * | 3/1989 | Tsuji et al. | .................. | 396/106 |
| 4,985,725 A * | 1/1991 | Serikawa | .................... | 396/159 |
| 5,093,681 A * | 3/1992 | Matsuzaki et al. | .......... | 396/163 |
| 6,661,460 B1 * | 12/2003 | Higuchi | .................. | 348/333.08 |
| 6,684,028 B2 * | 1/2004 | Shimada | ...................... | 396/157 |
| 6,707,485 B1 * | 3/2004 | Higuchi et al. | .............. | 348/371 |
| 6,961,093 B2 * | 11/2005 | Higuchi | ....................... | 348/371 |

FOREIGN PATENT DOCUMENTS

| | | |
|---|---|---|
| JP | 08-82738 A | 3/1996 |
| JP | 2002-99042 A | 4/2002 |
| JP | 2003-262900 A | 9/2003 |

* cited by examiner

*Primary Examiner*—Tuan Ho
*Assistant Examiner*—Kent Wang
(74) *Attorney, Agent, or Firm*—Drinker Biddle & Reath LLP

(57) ABSTRACT

A method for macro photographing with a digital camera without attaching a separate light source apparatus for macro photographing is provided. A method for macro photographing in automatic light emission mode of a digital camera with a two-stage shutter button, and capable of photographing an object in close range in automatic light emission mode by using built-in macro and normal flashes, in which the amount of light emission is automatically adjusted, includes: when the shutter button operates in stage 1, with the macro flash emitting light initially, and by performing auto focusing of an object, and setting light exposure automatically, determining a required light emission amount; and when the shutter button operates in stage 2, if the required light emission amount is equal to or less than the maximum light emission amount that the macro flash can emit, the macro flash emitting light, and if the required light emission amount is greater than the maximum light emission amount that the macro flash can emit, the normal flash which emits light in normal mode emitting light to photograph the object.

3 Claims, 10 Drawing Sheets

METHOD FOR CLOSE-RANGE AND GENERAL-RANGE PHOTOGRAPHING BY DIGITAL CAMERA

CROSS-REFERENCE TO RELATED PATENT APPLICATIONS

This application claims the priority of Korean Patent Application No. 2004-4443, filed on Jan. 20, 2004, in the Korean Intellectual Property Office, the disclosure of which is incorporated herein in its entirety by reference.

BACKGROUND OF THE INVENTION

1. Field of the Invention

The present invention relates to a close-range photographing and general-range photographing method of a digital camera, and more particularly, to a method for close-range and general-range photographing in automatic light emission mode and manual light emission mode of a digital camera capable of photographing an object in close range by using embedded normal and macro flashes.

2. Description of the Related Art

Macro photography is photographing an object in a close distance equal to or less than 30 cm. In a film camera, a macro lens should be attached for macro photographing. However, in a digital camera, because the focal length is usually shorter than that of a normal film camera, it is possible to photograph an object in close range without a change of lens.

When macro photography is executed by a digital camera, the amount of light falls short of a required light amount for photographing an object because the distance between the digital camera and the object is short.

Figure 1:
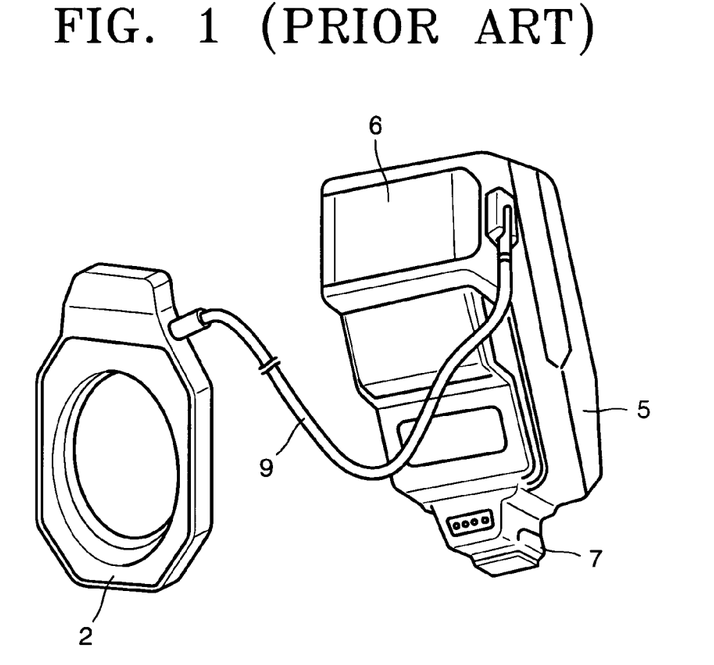
FIG. 1 is a schematic perspective view of a conventional digital camera.

The conventional macro flash disclosed in the U.S. Pat. No. 4,816,854 to solve this problem as shown in FIG. 1. The macro flash 2 as shown has a ring shape separate from the main body of a camera so that the macro flash 2 can be coupled with the camera in contact with the outer circumference surface of a lens. The ring-shaped macro flash 2 is connected through a connector 9 to a control unit 5 controlling the macro flash 2 and at the same time having a function of a normal flash 6. The control unit 5 has a coupling unit 7 so that the control unit 5 can be connected to a flash synchronization apparatus, such as a hot shoe, disposed on the main body of the camera. According to this, the ring macro flash 2 operates in synchronization with a shutter button (not shown) and the amount of light is adjusted by a light emission sensor or other methods.

However, since the conventional technology disclosed in U.S. Pat. No. 4,816,854 needs separate apparatuses for macro photography, such as the ring macro flash, the control unit, and the hot shoe, it is not appropriate for use in a slim-type digital camera, and there is inconvenience in that the apparatuses for macro photographing need to be carried separately. Since a strobe light source for normal photographing is used concurrently, the amount of light required for macro photographing cannot be emitted uniformly, and the amount of light emission also cannot be controlled precisely.

In addition, a Xenon lamp type strobe light source, which is usually used for normal photographing, can emit light only when the minimum light emission condition is 10 μs or over. However, when photographing is performed 10 μs or over with the Xenon lamp light source, there is a problem in that the amount of light of an object is saturated. In particular, because it is desirable that photographing is performed within 1/30 second to prevent hand trembling when macro photographing is performed, it is inappropriate to use the strobe light source as a flash for macro photographing.

Figure 2:
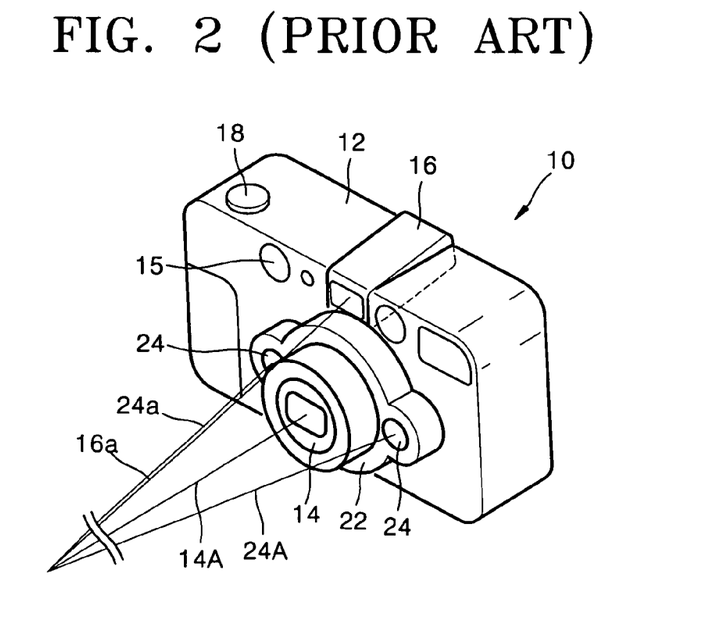
FIG. 2 is a schematic perspective view of another conventional digital camera.

FIG. 2 shows a digital camera 10 and a visible ray irradiation means 22 for macro photographing, employed by the camera disclosed in Japanese Laid-Open Patent Application H8-82738. The digital camera 10 has a lens 14, a light reception window 15, a shutter button 18, and a finder optical system 16. The visible ray irradiation means 22 formed separately from this digital camera has a pair of light sources 24, such as LEDs and Xenon, and is formed to be fixed to the lens 14 formed on the main body 12 of the camera.

The optical axis 14A of the lens 14 and the two optical axes 24A of the two light sources 24, which are disposed on the visible ray irradiation means 22, cross at a point that coincides with a close-up position. Thus, even when the optical axis 16A of the finder optical system 16 does not coincide with the close-up position on the lens optical axis 14A, whether or not the finder optical system optical axes 16A is at the center of a photographing screen can be determined by whether or not the optical axis 14A of the lens 14 coincides with the optical axes 24A of the two visible rays. However, in this conventional technology there is also a problem in that, for macro photographing, a separate visible ray irradiation means is required.

Besides the above disclosures, Japanese Laid-Open Patent Application Nos. 2003-262900 and 2002-099042 disclose apparatuses for macro photographing, but these all require separate visible ray irradiation means for macro photographing.

SUMMARY OF THE INVENTION

The present invention provides a method for close-range and general range photographing of a digital camera capable of macro photographing without attaching a separate light source apparatus for macro photographing.

The present invention also provides a method for close-range and general range photographing of a digital camera capable of automatically or manually adjusting brightness with respect to distance when macro photographing is performed.

According to an aspect of the present invention, there is provided a method for macro photographing in automatic light emission mode of a digital camera with a two-stage shutter button, and capable of photographing an object in a close range in automatic light emission mode by using built-in macro and normal flashes, in which the amount of light emission is automatically adjusted, the method including: when the shutter button operates in stage 1, with the macro flash emitting light initially, and by performing auto focusing of an object, and setting light exposure automatically, determining a required light emission amount; and when the shutter button operates in stage 2, if the required light emission amount is less than or equal to the maximum light emission amount that the macro flash emits, the macro flash emitting light, and if the required light emission amount is greater than the maximum light emission amount that the macro flash emits, the normal flash which emits light in normal mode emitting light to photograph the object.

According to another aspect of the present invention, there is provided a method for macro photographing in manual light emission mode of a digital camera with a two-stage shutter button, and capable of photographing an object in a close range in manual light emission mode by using built-in macro and normal flashes, the method including: manually setting a required amount of light emission of the object; focusing on the object; and when the shutter button operates in stage 2, if the required light emission amount is less than or equal to the maximum light emission amount that the macro flash emits, the macro flash emitting light, and if the required light emission amount is greater than the maximum light emission amount that the macro flash emits, the normal flash emitting light to photograph the object.

According to still another aspect of the present invention, there is provided a method for macro photographing of a digital camera with a two-stage shutter button, and capable of photographing an object in automatic mode and manual mode by using built-in macro and normal flashes, the method including: setting automatic mode or manual mode; when the automatic mode is set, with the shutter button operating in stage 1 and the macro flash emitting light, performing auto focusing of an object and setting a required light emission amount required for photographing; when the manual mode is set, manually setting a required amount of light emission required for photographing and focusing on the object; and when the shutter button operates in stage 2, according to the set required amount of light emission, with not emitting light, or the macro flash or the normal flash emitting light, photographing the object.

According to the present invention as described above, macro photographing is simply enabled without a need to carry a separate macro flashing apparatus, the amount of light can be uniformly irradiated, and precisely controlling the amount of light emission also becomes easier. Even when the light is saturated by a normal flash which usually has xenon as a light source, photographing can be performed with an appropriate light source. As a result, an appropriate amount of light can be obtained in macro photographing mode.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 3:
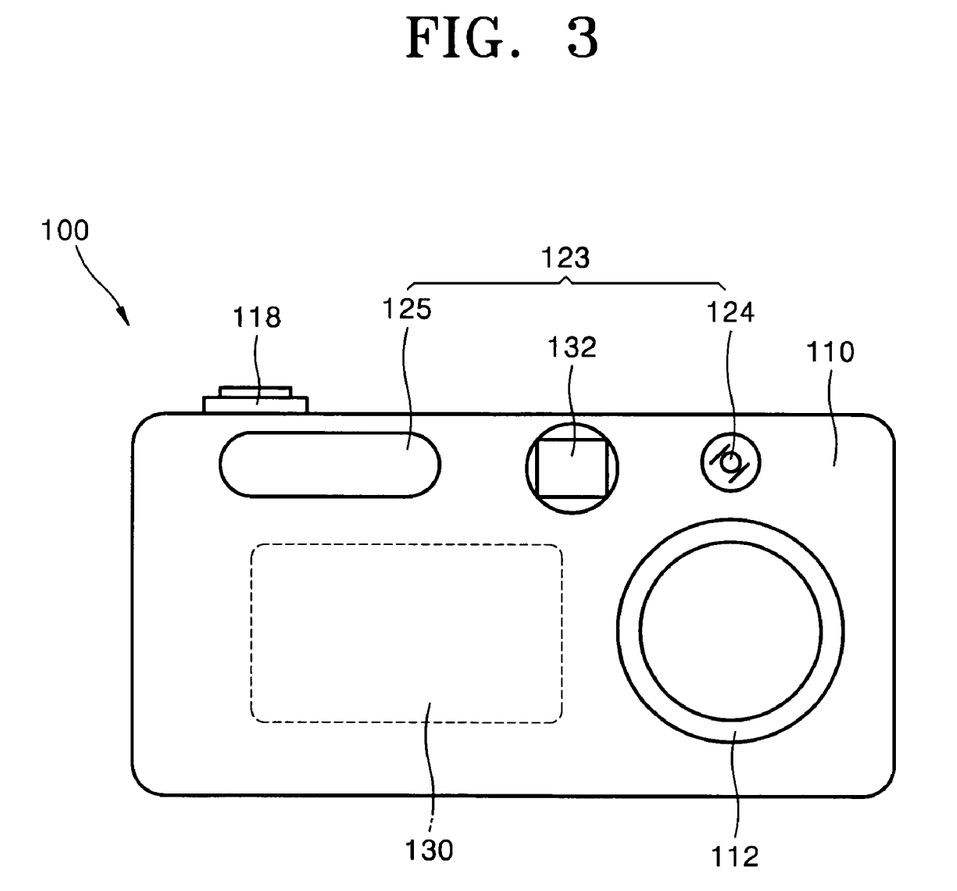
FIG. 3 is a front view showing the front surface of an embodiment of a digital camera employing a photographing method according to the present invention.
Figure 4:
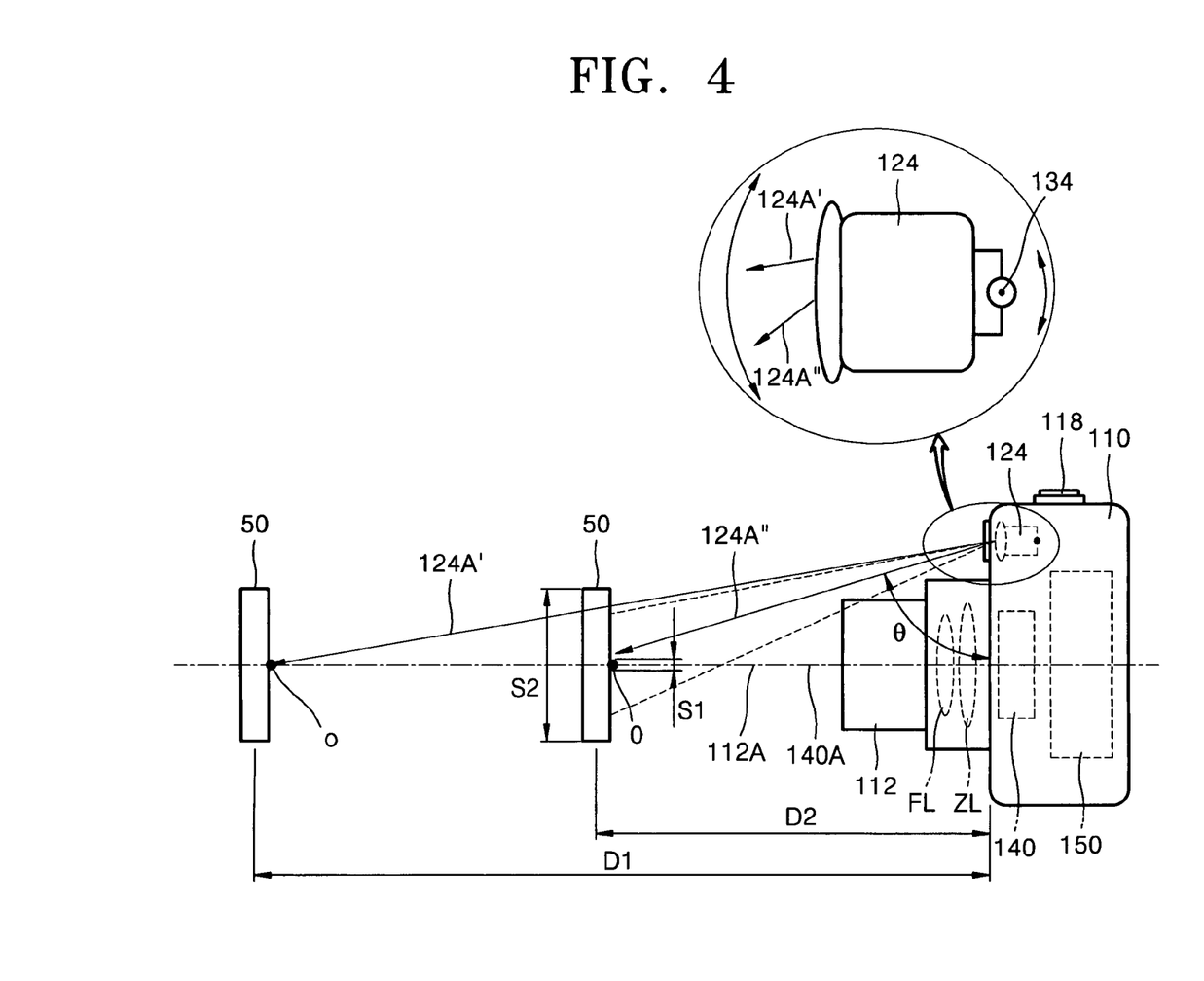
FIG. 4 is a sectional view showing the light emission angle with respect to the distance to an object, of a macro flash disposed on a digital camera employing a photographing method according to the present invention.

FIGS. 3 and 4 show an example of a digital camera employing a method for close-range and general-range photographing of a digital camera according to a preferred embodiment of the present invention. Referring to FIGS. 3 and 4, the digital camera 100 has a main body 110, a lens unit 112, an optic-to-electric conversion unit 140, an image processing unit 150, a shutter button 118, and a flash 123.

The lens unit 112 is disposed by being embedded on the front of the main body 110.

The lens unit 112 may have a focus lens (FL). The focus lens (FL) performs a function focusing on an object.

The optic-to-electric conversion unit 140 is disposed between the lens unit 112 and the main body 110. The optic-to-electric conversion unit 140 is a charge coupled device (CCD) or a complementary metal-oxide-semiconductor (CMOS) and converts light entering through the lens unit 112 into an electrical analog signal.

The optic-to-electric conversion unit 140 is connected to the image processing unit 150. The image processing unit 150 perform digital image processing of the electrical signal transmitted by the optic-to-electric conversion unit 140. The image processing unit 150 may have a digital signal processor (DSP) controlling operations of the lens unit 112 and the optic-to-electric conversion unit 140.

On the main body 110, the shutter button 118 is disposed. The shutter button 118 is usually disposed on the top side of the main body 110, and by adjusting a time opening and closing the iris (not shown), adjusts the amount of light entering through the lens unit 112 and flowing into the main body 110.

The shutter button 118 operates in two stages. When the shutter button 118 operates in stage 1, that is, when the shutter button 118 is pressed to stage 1, the camera focuses on an object 50 according to user setting, while the amount of light exposure can be set. In this case, setting the amount of light exposure can be performed by the user in manual light emission mode, or in automatic light emission mode. When the setting is performed in automatic light emission mode, automatic exposure (AE) mode is performed such that the amount of light exposure of incident light luminance is automatically calculated and automatic focusing (AF) mode is performed such that a current position of the focus lens (FL) is set. At the same time, with respect to the amount of light exposure and the position of the focus lens, a required amount of light emission required for actual photographing is set.

When the shutter button 118 operates in stage 2, by considering the amount of light emission and the exposure time set when the shutter button 118 operates in stage 1, an object is actually photographed. In this case, whether or not to operate a flash is determined according to the required amount of light emission.

The shutter button 118 is connected to the flash 123. The flash 123 can emit light in synchronization with the operation of the shutter button 118, and has a normal flash 125 performing strobe light emission and a macro flash 124 used for a close range object and performing LED light emission or high luminance light source light emission.

In the present invention, the macro flash 124 and the normal flash 125 are embedded in the main body 110.

When the shutter button 118 operates in stage 1, the macro flash 124 emits light to perform a function of an auxiliary light source for focusing and setting the amount of light exposure, and when the shutter button 118 operates in stage 2, can perform a function of a main light source. In addition, the image processing unit 150 automatically adjusts the amount of light emission with respect to the distance of the object, and with respect to the amount of light emission, and can select light emission of the macro flash 124 or the normal flash 125.

Preferably, the macro flash 124 has a light source capable of fine control of the amount of light with respect to changes in current and voltage, for example, a high luminance LED light source, such that a required amount of light can be uniformly irradiated when macro photographing is performed, and the amount of light emission can be precisely controlled.

It is desirable that when the macro flash 124 is used, an area (S2) of light emission when the shutter button 118 operates in stage 2 is greater than an area (S1) of light emission when the shutter button 118 operates in stage 1. This is because when the shutter button 118 operates in stage 1, the macro flash 124 performs an auxiliary light source function for auto focusing and for setting the amount of automatic light exposure, and the light irradiation area of the macro flash 124 does not need to be big, but when the shutter button 118 operates in stage 2, light emission should be applied to the entire area of the object in order take a clear image of the object.

Also, it is desirable that the angle of irradiation of the macro flash 124 varies with respect to the distance to the object such that the irradiation center (O) of the light source of the macro flash 124 coincides with the optical axis 112A of the lens unit and the optical axis 140A of the optic-to-electric conversion unit. That is, in a general photographing distance, when the macro flash 124 performs the auxiliary light source function when stage 1 of the shutter button 118 is applied, the distance (D1) between the digital camera 100 and the object is big. Accordingly, even though the irradiation center of the macro flash 124 does not coincide with the optical axis 112A of the lens unit and the optical axis 140A of the optic-to-electric conversion unit, the function for auto focusing (AF) and auto exposure (AE) can be performed normally. However, when macro photographing is performed, the distance between the lens unit 112 and the object is small, and when stage 2 of the shutter button 118 is applied, the macro flash 124 performs the main light source function. Accordingly, only when the irradiation center (O) of the light source 124A" of the macro flash 124 coincides with the optical axis 112A of the lens unit and the optical axis 140A of the optic-to-electric conversion unit, can the image of the object be obtained clearly as a whole.

In particular, in macro photographing in which the distance (D2) to the object is small, if the position of irradiation is not adjusted, the irradiation center of the macro flash 124 becomes greatly different from the optical axis 112A of the lens unit and the optical axis 140A of the optic-to-electric conversion unit. In this case, the photographed object cannot have a clear image as a whole. Accordingly, it is desirable that the angle of irradiation of the macro flash 124 varies with respect to the distance to the object.

In order to enable change of the irradiation angle (θ) with respect to the focus of the object, it is desirable to have a macro flash driving unit 134 capable of rotating the macro flash 124.

Figure 5:
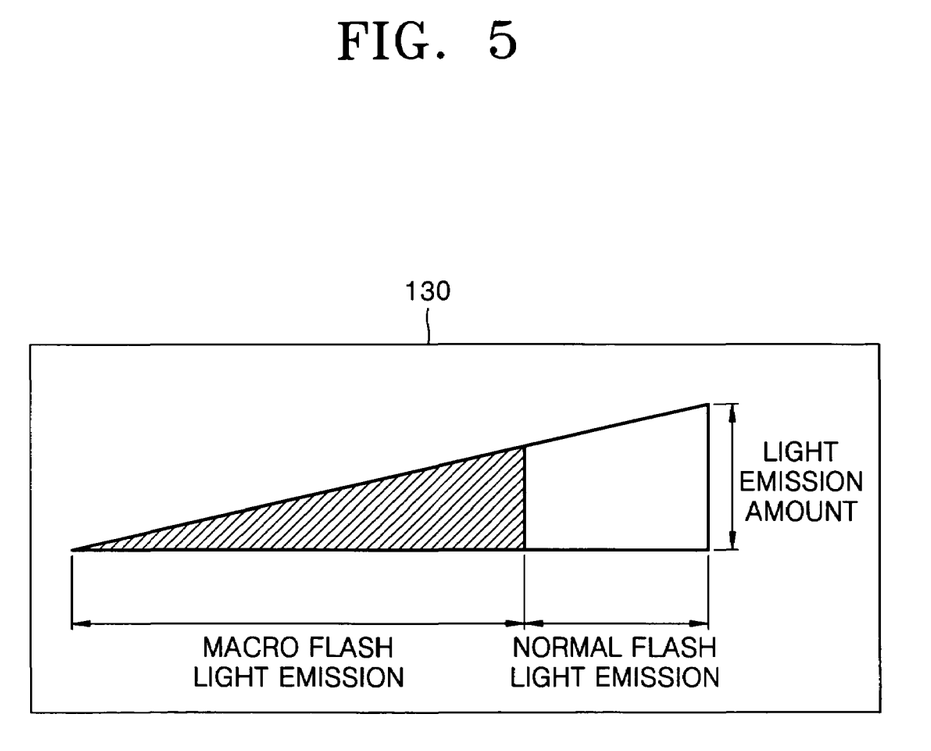
FIG. 5 is a sectional view of a user input unit disposed on a digital camera employing a photographing method according to the present invention.

Meanwhile, as shown in FIGS. 3 and 5, a user input unit 130 can be further disposed on the main body 110. The user input unit 130 performs an on-screen display (OSD) function receiving a signal from the image processing unit 150 and displaying the state of operations while at least the amount of light emission can be adjusted in macro manual mode. In the user input unit 130, the user can select whether flashlight is not emitted, or the macro flash 124 emits light, or the normal flash 125 emits light.

The OSD is a function directly displaying information that the user needs to know or should know about the digital camera, on the screen. In this information, brightness, contrast, tuning, RGB adjustment, the size of the screen in width and length, and position adjustment can be included.

Figure 6:
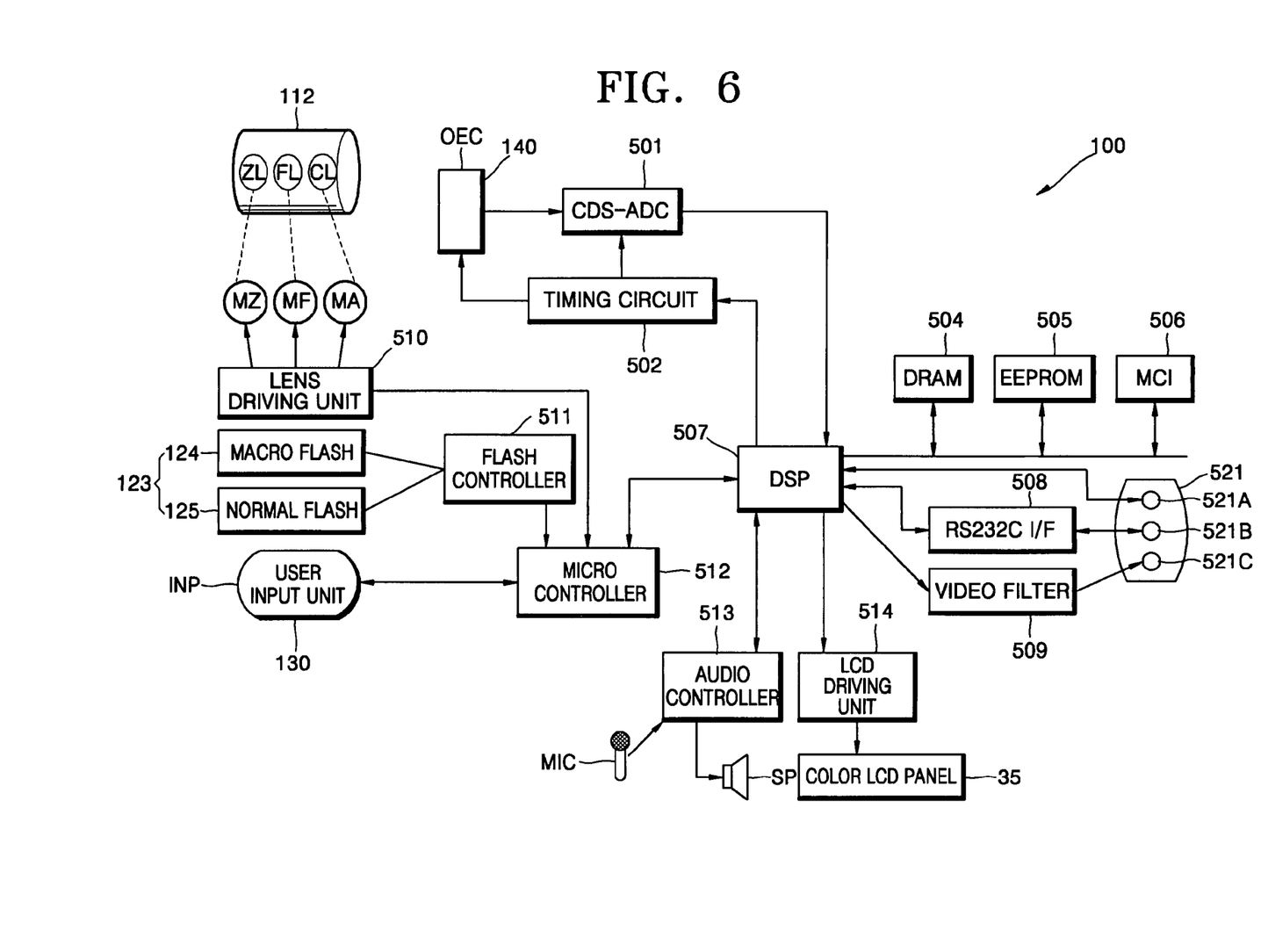
FIG. 6 is a block diagram of the structure of a digital camera employing a photographing method according to the present invention.

Referring to FIG. 6, an example of the entire structure of the digital camera 100 employing a method for close-range and general-range photographing according to the present invention will now be explained.

The light entering into the main body of the digital camera 100 from the object is processed optically by the lens unit 112 and the optic-to-electric conversion unit (OEC) 140. The lens unit 112 may include a focus lens (FL), a zoom lens (ZL), and compensation lens (CL) for object focusing.

When focusing on the object is performed automatically or manually, the current position of the focus lens (FL) varies in relation to the distance to the object. In auto focusing mode, a focus motor (MF) is driven by a microcontroller 512 controlling a lens driving unit 510 such that the position of the focus lens (FL) changes. By adjusting the position of the focus lens (FL), focusing on the object is performed.

In an example of object focusing, the focus lens (FL) moves from the front position to the back position, and in this process, a position of the focus lens (FL) in which the high frequency content of an image signal becomes the most, for example, the position step number of the focus motor (MF), is set, and focusing on the object is performed. Here, the zoom lens (ZL) plays the role adjusting the image angle in relation to the position of the object, and the compensation lens (CL) plays the role compensating for the entire refraction ratio.

The optic-to-electric conversion unit (OEC) 140 that is a CCD or a CMOS converts light entering from the lens unit 112 into an electrical analog signal. The optic-to-electric conversion unit 140 is connected to the image processing unit 150.

The image processing unit 150 may include a digital signal processor (DSP) 507 processing a digital signal, a microcontroller 512 with the DSP 507, a dynamic random access memory (DRAM) 504, an electrically erasable programmable read only memory (EEPROM) 505, an LCD driving unit 514, a universal serial bus (USB) connection unit 521A, an RS232C interface 508, a video filter 509, and a video output unit 521C.

The DSP 507 controls the operation of the analog-digital conversion unit 501 by controlling a timing circuit 502. A correlation double sampler and analog-to-digital converter (CDS-ADC) device 501 as an analog-to-digital conversion unit processes the analog signal from the optic-to-electric unit (OEC) 140, removes the high frequency noise, adjusts the amplitude, and converts into a digital signal.

The DSP 507 processes the digital signal from the CDS-ADC device 501 and generates a digital image signal which is divided into a luminance signal and a chrominance signal.

The user input unit (INP) 130 receives the signal of the microcontroller 512 and displays the operation state, and at least can adjust the amount of light emission in macro photographing mode.

In the DRAM 504, the digital image signal from the DSP 507 is temporarily stored. In the EEPROM 505, algorithms and set data required for the operation of the DSP 507 are stored. In the memory card interface 506, a memory card of the user is attached and detached.

The digital image signal from the DSP 507 is input to the LCD driving unit 514 and as a result, an image is displayed on the color LCD panel 35.

Meanwhile, the digital image signal from the DSP 507 can be transmitted in serial communication through the USB connection unit 521A or through the RS232C interface 508 and its connection unit 521B, or can be transmitted as a video signal through the video filter 509 and the video output unit 521C.

An audio controller 513 outputs a voice signal from a microphone (MIC) to the DSP 507 or a speaker (SP), and outputs an audio signal from the DSP 507 to the speaker (SP).

Meanwhile, the microcontroller 512 drives the flash 123 by controlling the operation of the flash controller 511 according to a signal from a flash-light amount sensor 19. The flash 123 has the normal flash 125 emitting strobe light, and the macro flash 124 playing the auxiliary light source role when the shutter button 118 operates in stage 1, and emitting light for macro photographing when the shutter button 118 operates in stage 2. Meanwhile, the digital camera has a light irradiation sensor and when the amount of light passing through the optic-to-electric conversion unit 140 becomes the set required amount of light emission, the light irradiation sensor stops the light emission of the macro flash 124 such that the second amount of light emission by the macro flash 124 can be controlled.

Figure 7:
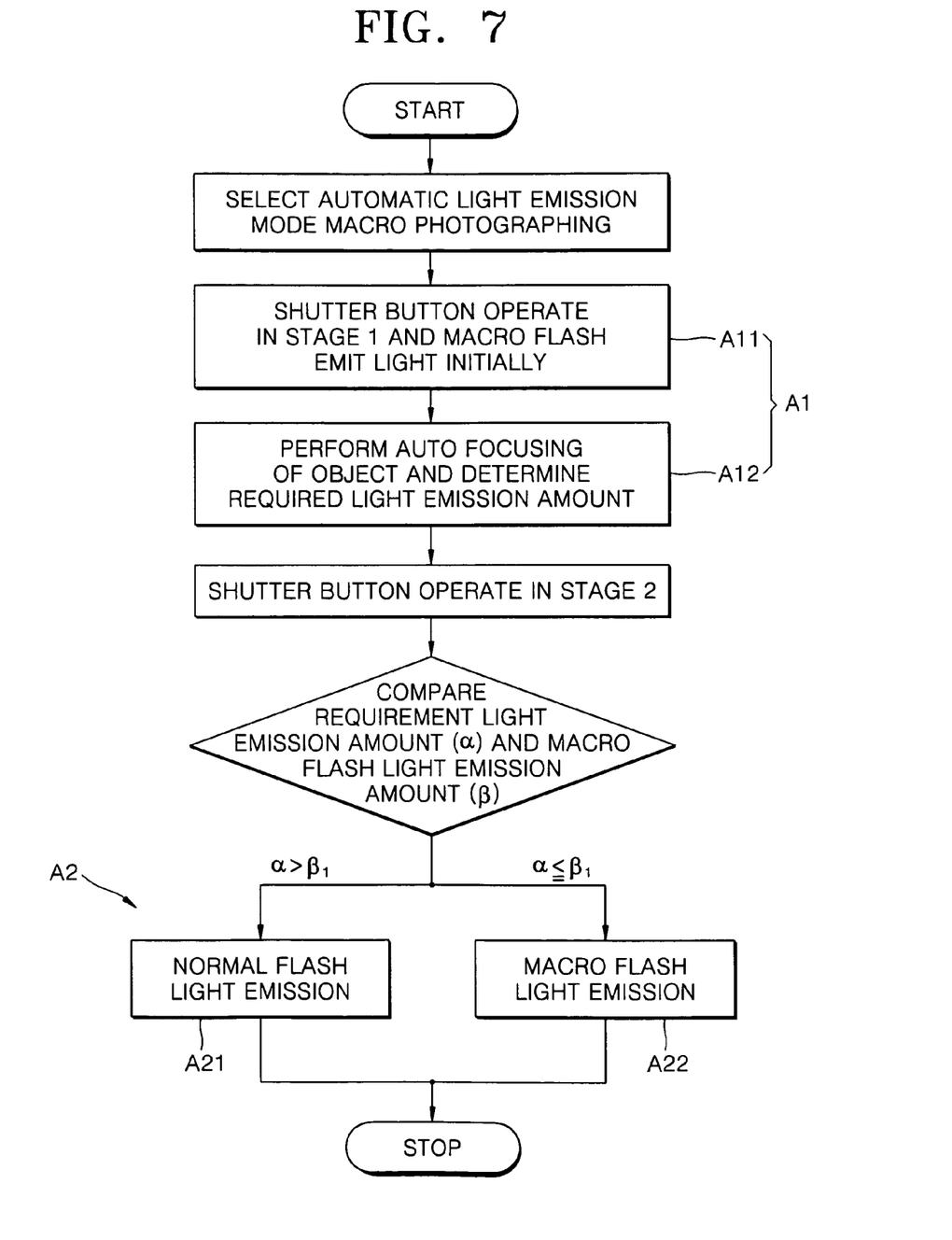
FIG. 7 is a flowchart of the steps performed by a method for macro photographing in automatic light emission mode of a digital camera according to a preferred embodiment of the present invention.

FIG. 7 is a flowchart of the steps performed by a method for macro photographing in automatic light emission mode of a digital camera according to a preferred embodiment of the present invention. In the method for macro photographing in automatic light emission mode of a digital camera according to a preferred embodiment of the present invention, the shutter button operates in two stages, and by using the embedded macro flash and normal flash, an object in a close range can be photographed in automatic light emission mode.

Referring to FIGS. 4 through 7, in the method for macro photographing in automatic light emission mode of a digital camera according to a preferred embodiment of the present invention, first, the user selects the macro mode and automatic light emission mode. Then, step A1 is performed in which when the shutter button 118 operates in stage 1, the macro flash 124 emits light initially, auto focusing of the object 50 is performed, and the amount of light exposure is automatically set to determine a required amount of light emission required for photographing. Then, step A2 is performed in which when the shutter button 118 operates in stage 2, and if the required amount of light emission is equal to or less than the maximum amount of light that the macro flash 124 can emit, the macro flash 124 emits light, and if the required amount is greater than the maxim amount of light that the macro flash 124 can emit, the normal flash 125 emits light and the object is photographed.

In this case, in step Al, as shown in FIG. 4, it is desirable that the angle (.theta.) of irradiation of the macro flash 124 varies with respect to the distance (D1, D2) to the object such that the irradiation center (O) of the macro flash 124 coincides with the optical axis 112A of the lens unit and the optical axis 140A of the optic-to-electric conversion unit. This is because when macro photographing is performed and stage 2 of the shutter button 118 is applied, the macro flash 124 performs the main light source function such that only when the irradiation center (O) of the light source 124A" of the macro flash 124 coincides with the optical axis 112A of the lens unit and the optical axis 140A of the optic-to-electric conversion unit, the image of the object can be obtained clearly as a whole.

In this case, as shown in FIG. 6, preferably, in the step for auto focusing of the object with respect to the distance to the object, the focus lens (FL) moves via driving the focus motor (MF). By calculating position data of the focus motor (MF) corresponding to the changed focus lens (FL), the auto focusing is performed.

In an example for explanation of the auto focusing of the object, the current position of the focus lens (FL) performing focusing of the object varies in relation to the distance (D1, D2) to the object. In the auto focusing step, the microcontroller 512 controls the lens driving unit 510 such that the focus motor (MF) is driven. According to the signal of the focus motor (MF), the focus lens (FL) moves from the front to the back. In this process, the position of the focus lens (FL) in which the high frequency content of an image signal becomes the greatest is determined. This position may be according to the position step number of the focus motor (MF). Thus, focusing on the object can be performed.

A step for analyzing the image of the object and automatically setting the amount of light exposure can be performed by analyzing the image of the object in the DSP 507 and identifying the illumination environment of the photographing location.

The amount of light exposure set by performing the steps for the auto focusing and setting the amount of light exposure, and the distance to the object are calculated by the DSP 507. A required amount of light emission for photographing is set by the calculation in order to emit a most appropriate amount of light for photographing, such that obtaining an optimal image is enabled.

In this case, adjusting the second amount of light emission can be performed by controlling the turn-on time of the macro flash 124 or controlling the current flowing into the macro flash 124.

In the case where the turn-on time of the macro flash 124 is controlled, when the shutter button 118 operates in stage 1, the second light emission time of the macro flash 124 is calculated and a required amount of light emission is set, and when the shutter button operates in stage 2, the macro flash emits light secondly for the set time. By doing so, the adjusting can be performed.

Figure 8:
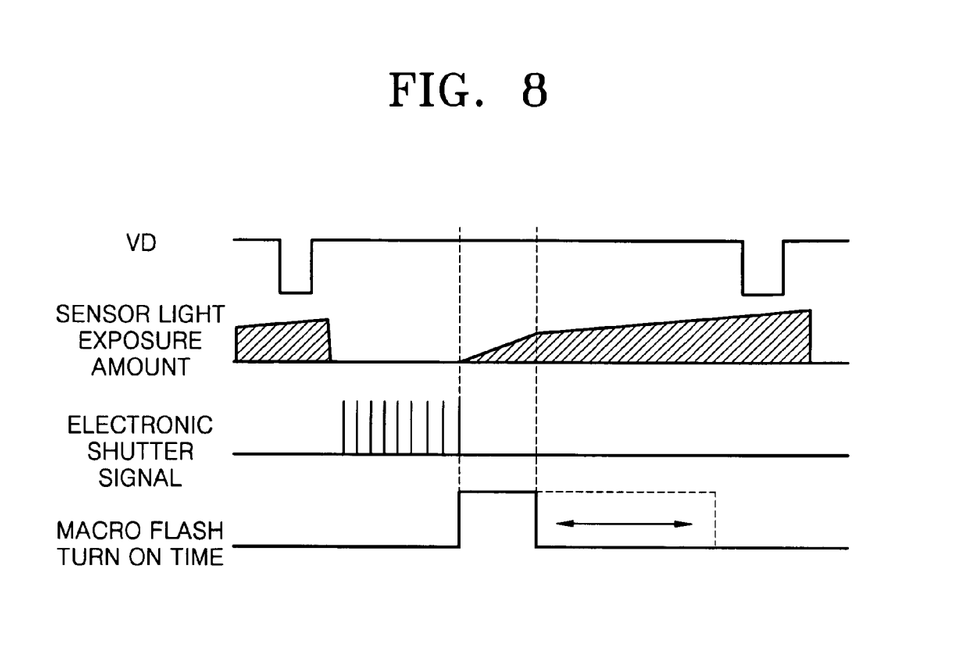
FIG. 8 is a signal diagram showing an example of a light amount control method of a macro flash employed in FIG. 7.

This will now be explained in detail with reference to FIG. 8. By a vertical synchronization signal (vertical driver, VD), a frame is set. In order to obtain a required amount of light emission when the macro flash 124 emits light secondly, in step A1, the light emission time of the shutter button 118 is scanned and a light emission time appropriate to the operation of the shutter button 118 in stage 2 is set. Then, when the shutter button operates in stage 2, the signal of an electronic shutter is fixed to a predetermined length and the macro flash 124 is made to emit light for a preset time. When the macro flash 124 emits light, the sensor light exposure amount rapidly increases, and accordingly, by adjusting the turn-on time of the macro flash 124, the second amount of light emission of the macro flash 124 can be controlled.

Figure 9:
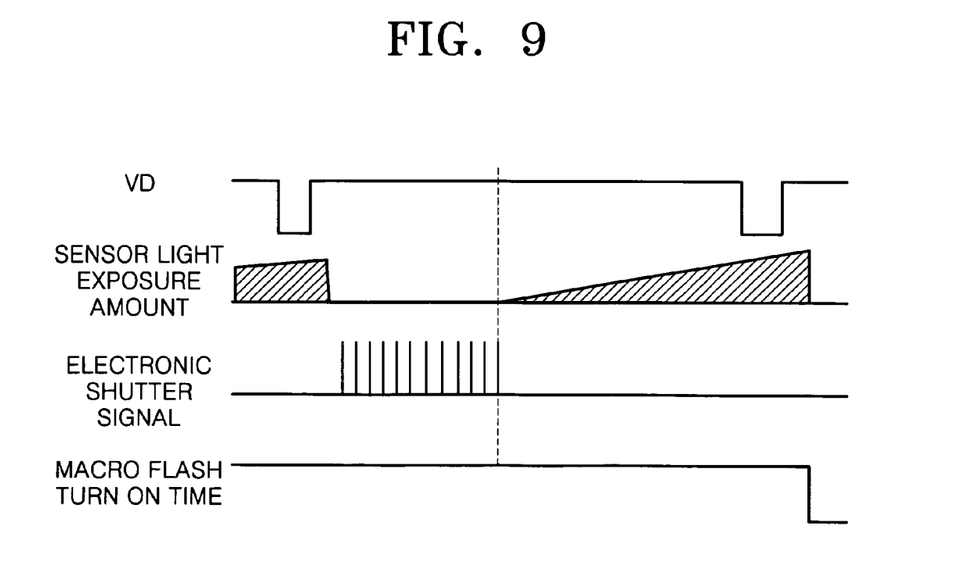
FIG. 9 is a signal diagram showing a modified example of FIG. 8.

Unlike this, as shown in FIG. 9, when the shutter button 118 operates in stage 1, by controlling the electronic shutter signal provided to the CCD, a required amount of light emission of the macro flash 124 can be set. Then, when the shutter button 118 operates in stage 2, in a state where the macro flash 124 is made to emit light continuously while the shutter button 118 operates in stage 2, by controlling the signal of the electronic shutter button, the current flowing into the macro flash 124 is controlled such that the amount of light emission can be controlled.

Here, the electronic shutter means a signal provided to the optic-to-electric conversion unit 140 and when the electronic shutter button operates, the reset process is repeatedly performed such that a state where there is no sensor light exposure amount continues.

In this case, in the step A2 described above, when the shutter button 118 operates in stage 2, it is desirable that the time opening and closing the lens unit 112, that is, the exposure time, does not exceed 1/30 second. This is so that the effect of hand trembling may be reduced such that a clear image can be obtained.

Here, by comparing the required amount ($\alpha$) of light emission with the amount ($\beta$) of its own light that the macro flash 124 can emit, the DSP 507 can determine the type of flash light emission automatically.

That is, as shown in FIG. 7, by the comparison, when the required amount ($\alpha$) of light emission is greater than the maximum amount ($\beta 1$) of its own light that the macro flash 124 can emit ($\alpha > \beta 1$), the normal flash 125 is made to emit light in A21.

Unlike this, when the required amount ($\alpha$) of light emission is less than or equal to the maximum amount ($\beta 1$) of its own light that the macro flash 124 can emit ($\alpha \leq \beta 1$), the macro flash 124 is made to emit light secondly in A22.

According to this, in case that the photographing satisfies the saturation condition, when macro photographing is performed with the normal flash 125 made to emit light, an auxiliary light source for auto focusing is utilized as a macro flash such that the photographing is enabled. At this time, in addition to the distance (D) to the object, the type of the flash to emit light varies also with respect to the amount of light exposure (Lu).

Figure 10:
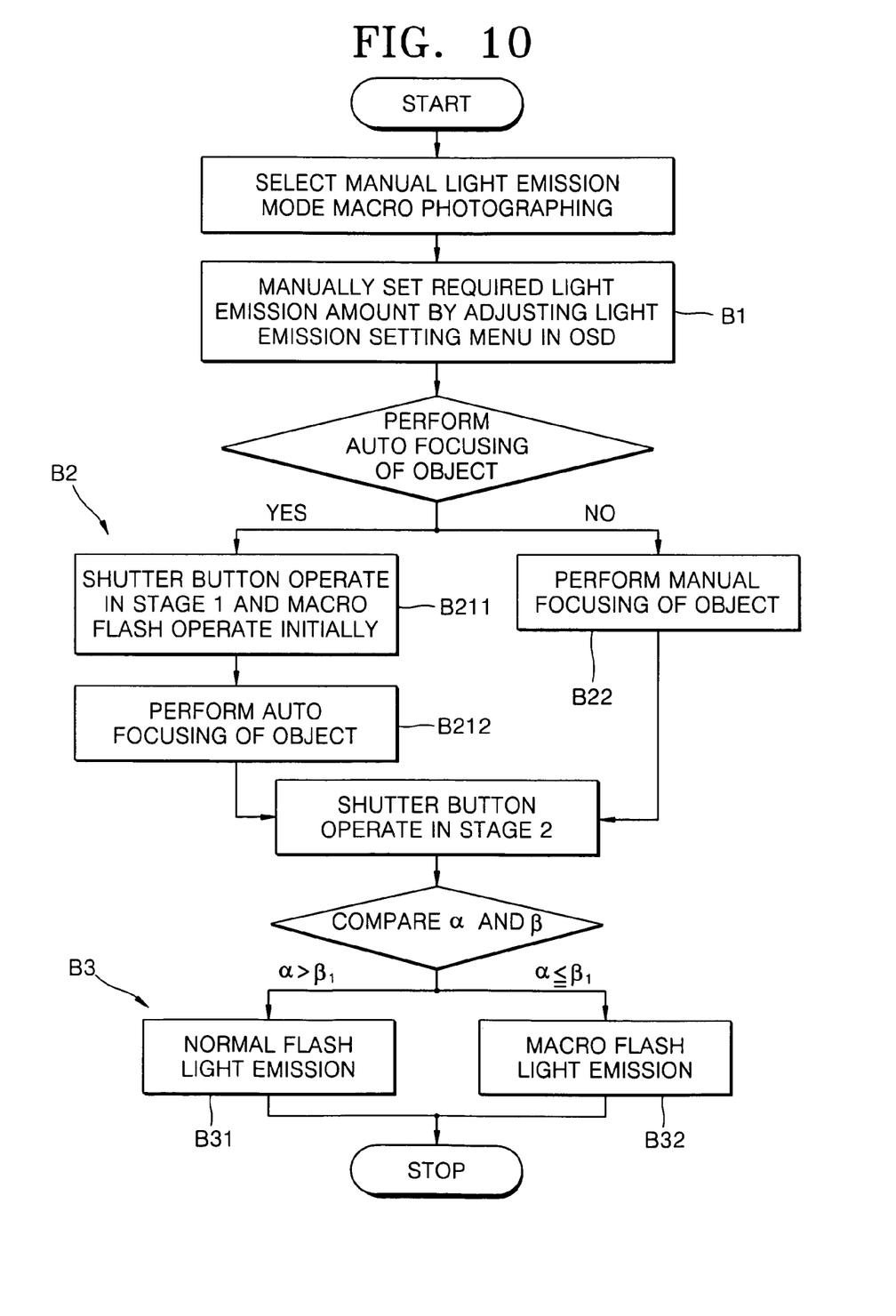
FIG. 10 is a flowchart of the steps performed by a method for macro photographing in manual light emission mode of a digital camera according to another preferred embodiment of the present invention.

FIG. 10 is a flowchart of the steps performed by a method for macro photographing in manual light emission mode of a digital camera according to another preferred embodiment of the present invention.

Referring to FIGS. 3 through 6 and 10, in the method for macro photographing in manual light emission mode of a digital camera according to another preferred embodiment of the present invention, the object 50 in a close range is photographed in manual light emission mode by using the embedded macro flash 124 and normal flash 125. First, macro photographing and light emission mode are selected.

Then, by selecting manual light emission mode, the method is initiated. That is, the method for macro photographing in manual light emission mode of a digital camera includes step B1 for manually setting a required amount of light emission of the object, step B2 for focusing on the object, and step B3 for photographing the object with the macro flash 124 or the normal flash 125 emitting light according to the required amount of light emission when the shutter button 118 operates.

Step B1 is performed by adjusting a setting menu of the amount of light emission in an OSD. Preferably, in the OSD, the size of light emission amount varying according to manipulation of the setting menu of the amount of light emission is displayed such that whether or not the macro flash 124 and the normal flash 125 emit light can be adjusted manually. That is, as shown in FIG. 5, the user input unit 130 having the OSD function receives the signal of the microcontroller 512 and displays the state of operation, and at least can adjust the required amount of light emission in macro manual mode, such that the user can easily select the amount of light emission for macro photographing.

Preferably, in step B2, focusing on the object is automatically performed by using the macro flash 124. When focusing on the object is automatically performed in step B2, the shutter button 118 operates in two stages. That is, if the macro flash 124 is made to emit light initially when the shutter button 118 operates in stage 1, focusing of the object is automatically performed. At this time, if the shutter button 118 operates in stage 1, step B211 for the macro flash 124 operating initially, and step B212 for auto focusing of the object are performed.

Unlike this, step B22 for manually focusing on the object can be performed. A variety of methods can be used for the manual focusing, and as an example, it can be performed by the user selecting a desired distance while pressing a manual focusing button (not shown).

Then, when the shutter button 118 operates in stage 2, the macro flash 124 or the normal flash 125 emits light according to the required amount of light emission, such that the object is photographed. In this case, position signal data transferred from the macro flash driving unit 134, which drives the macro flash 124 rotatably, is calculated by the DSP 507 to adjust the position the focus lens (FL), and by doing so, step B2 can be performed.

Preferably, the angle of irradiation of the macro flash 124 varies with respect to the distance to the object such that the irradiation center (O) of the macro flash 124 coincides with the optical axes 112A of the lens unit and the optical axes 140A of the optic-to-electric conversion unit. This is because when macro photographing is performed and stage 2 of the shutter button 118 is applied, the macro flash 124 performs the main light source function such that only when the irradiation center (O) of the macro flash 124 coincides with the optical axes 112A of the lens unit and the optical axes 140A of the optic-to-electric conversion unit, the image of the object can be implemented clearly as a whole.

In step B3, when the required amount ($\alpha$) of light emission is greater than the maximum amount ($\beta 1$) of its own light that the macro flash 124 can emit ($\alpha > \beta 1$), the normal flash 125 is made to emit light in B31.

Unlike this, when the required amount ($\alpha$) of light emission is less than or equal to the maximum amount ($\beta 1$) of its own light that the macro flash 124 can emit ($\alpha \leq \beta 1$), the macro flash 124 is made to emit light secondly in B32.

According to this, in case that the photographing satisfies the saturation condition, when macro photographing is performed with the normal flash 125 made to emit light, an auxiliary light source for auto focusing is utilized as a macro flash such that the photographing is enabled. At this time, in addition to the distance (D) to the object, the type of the flash to emit light varies also with respect to the amount of light exposure (Lu).

In this case, in step B3, it is desirable that the time opening and closing the lens unit 112 by the shutter button 118 does not exceed 1/30 second, and according to this, the effect of hand trembling is reduced when photographing is performed.

Figure 11:
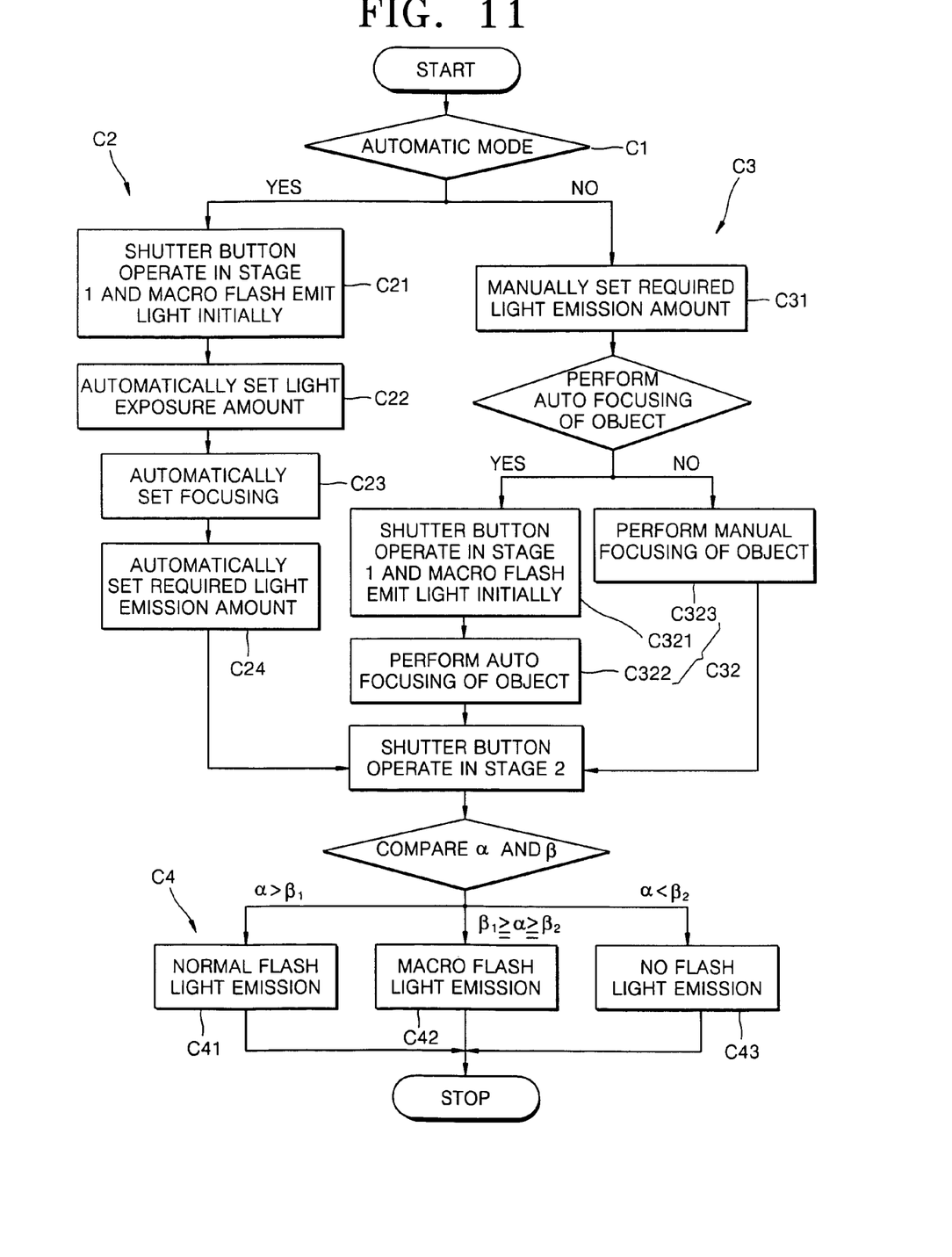
FIG. 11 is a flowchart of the steps performed by a photographing method of a digital camera according to still another preferred embodiment of the present invention.

Meanwhile, FIG. 11 shows a method for photographing of a digital camera according to still another preferred embodiment of the present invention, in which a shutter button operates in two stages and an object can be photographed in automatic mode and manual mode by using embedded macro and normal flashes.

Referring to FIG. 11, the method for photographing of a digital camera according to the present invention includes: step C1 for setting a photographing mode to automatic mode or manual mode; step C2 for setting a required amount of light emission required for photographing by focusing on the object by using the macro flash 124 with the shutter button operating in stage 1, when the automatic mode is set; step C3 for manually setting a required amount of light emission and focusing on the object when the manual mode is set; and step C4 for photographing the object with the macro flash 124 or the normal flash 125 emitting light or not according to the required amount of light emission when the shutter button operates in stage 2.

This will be explained in more detail with reference to FIGS. 3 through 6 and 11. If macro photographing mode and light emission mode are selected in the digital camera, a window indicating to select any one of automatic light emission mode and manual light emission mode pops up in the user input unit 130.

If the automatic mode is selected, the step C2 is performed. The step C2 includes step C21 for operating the shutter button in stage 1 and making the macro flash 124 emit light initially, step C22 for analyzing the image of the object and automatically setting the amount of light exposure, step C23 for auto focusing of the object with respect to the distance of the object, and step C24 for automatically setting a required amount of light emission required for photographing with respect to the distance (D1) of the focus lens and the amount of the light emission.

Unlike this, if the manual mode is selected, the step C3 is performed for photographing. That is, the step for focusing on the object by manually setting a required amount of light emission is performed. In this case, it is preferable that in the step for focusing on the object, by using the macro flash 124, focusing of the object is automatically performed.

The step for setting the required amount of light emission for the object in the step C3 is performed by adjusting the light emission amount setting menu in an OSD. In this case, preferably, in the OSD, the size of light emission amount varying according to manipulation of the setting menu of the amount of light emission is displayed such that whether or not the macro flash 124 and the normal flash 125 emit light can be adjusted manually.

Figure 12:
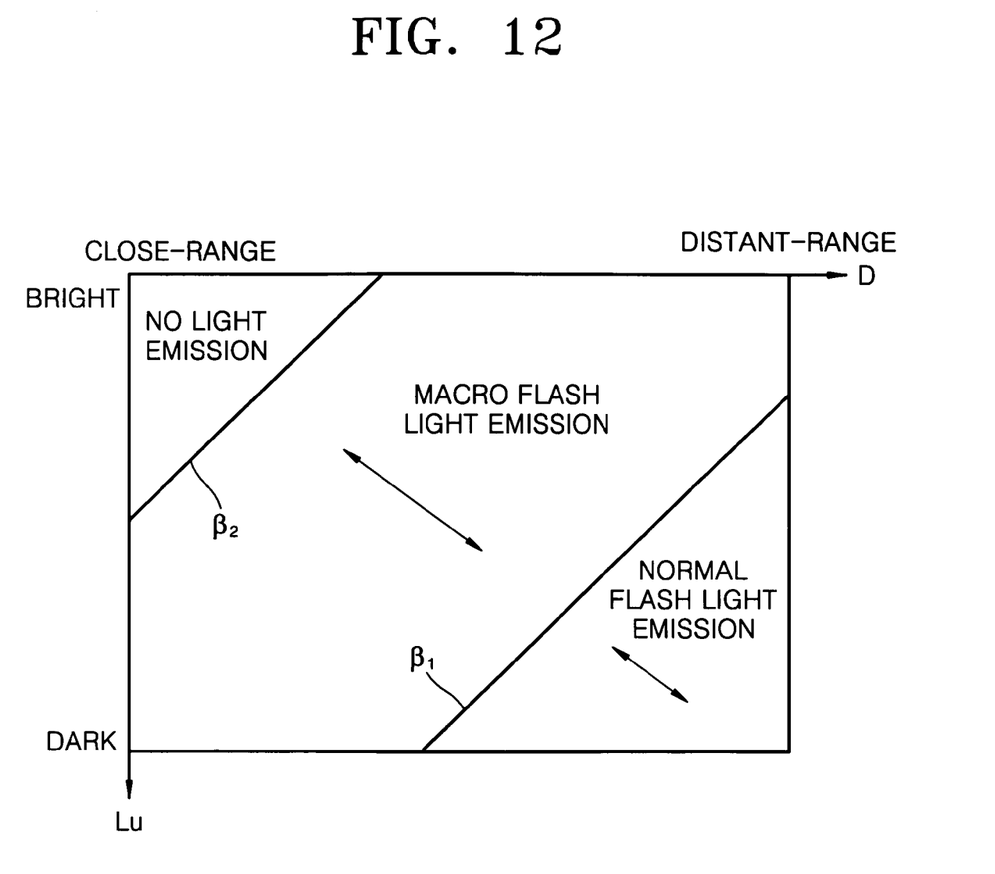
FIG. 12 is a graph showing a second light emission area of a flash with respect to the distance and exposure amount employed in a photographing method of a digital camera of FIG. 11.

Then, as shown in FIG. 12, the type of a flash is selected by comparing the set required amount of light emission and the individual amounts of light emission by the normal flash 125 and the macro flash 124.

That is, if the required amount ($\alpha$) of light emission set in step C2 or C3 is less than the minimum amount ($\beta 2$) of light that the macro flash 124 can emit ($\alpha < \beta 2$), no light is emitted in step C43 and if the required amount ($\alpha$) of light emission set in step C2 or C3 is greater than the maximum amount ($\beta 1$) of light that the macro flash 124 can emit, the normal flash 125 emitting light in normal mode emits light in step C41. If the required amount ($\alpha$) of light emission is between the minimum amount ($\beta 2$) and the maximum amount ($\beta 1$) ($\beta \times \alpha = \beta 1$), the macro flash 124 emits light secondly in step C42. At this time, in addition to the distance (D) to the object, the type of the flash to emit light varies also with respect to the amount of light exposure (Lu).

Here, preferably, when the shutter button operates in stage 2 in step C2 or C3, the time for light exposure is limited to $\frac{1}{30}$ second or less.

According to the present invention as described above, a macro flash is embedded in a digital camera such that a separate macro light emission apparatus does not need to be carried and convenient macro photographing is enabled.

In addition, by using an LED, which is used for auto focusing and auto exposure, as a macro flash, the amount of light can be uniformly irradiated, and precisely controlling the amount of light emission also becomes easier. Even when the light is saturated by a normal flash which usually has xenon as a light source, photographing can be performed with an appropriate light source.

Furthermore, the amount of light can be adjusted automatically or manually with respect to the distance to an object and according to this, non flashlight, or macro flashlight, or macro flashlight and normal flashlight can be selected such that an appropriate amount of light can be obtained in macro photographing mode.

What is claimed is:

1. A method for macro photographing with a digital camera including a shutter button having first and second stages, and capable of photographing an object in an automatic photographing mode and a manual photographing mode by using built-in macro and normal flashes, the method comprising:
    setting the digital camera in one of the automatic photographing mode and the manual photographing mode;
    performing automatic focusing of an object and automatic setting of a first light emission amount for automatic photographing the object when the automatic mode is set, when the shutter button is in the first stage and when the macro flash is emitting light;
    manually setting of a second light emission amount for manual photographing and focusing on the object when the manual mode is set, and
    photographing the object when the shutter button is in the second stage, wherein photographing occurs according to one of the first and second light emission amounts facilitated by at least one of the macro flash and the normal flash emitting light.

2. The method of claim 1, wherein the step of photographing the object comprises:
    first determining if a required light emission amount for photographing is less than a minimum light emission amount from the macro flash and preventing light emission therefrom;
    second determining if a required light emission amount is equal to or greater than the minimum light emission amount from the macro flash and equal to or less than a maximum light emission amount from the macro flash and emitting light therefrom; and
    third determining if a required light emission amount is greater than the maximum light emission amount from the macro flash and emitting light from the normal flash.

3. The method of claim 1, wherein the manually setting step is performed by adjusting a light emission amount from a setting menu displayed in an on screen display.

* * * * *